United States Patent [19]

Yunokuchi et al.

[11] Patent Number: 4,875,276

[45] Date of Patent: Oct. 24, 1989

[54] METHOD OF PRODUCING MAGNETIC HEAD DEVICE

[75] Inventors: Ryu Yunokuchi; Shinichi Omori; Masao Ohkita, all of Furukawa, Japan

[73] Assignee: Alps Electric Co., Ltd., Tokyo, Japan

[21] Appl. No.: 327,223

[22] Filed: Mar. 22, 1989

[30] Foreign Application Priority Data

Jun. 17, 1988 [JP] Japan .................. 63-148182

[51] Int. Cl.[4] ............................................. G11B 5/42
[52] U.S. Cl. ..................................... 29/603; 360/104
[58] Field of Search .................. 29/603; 360/102, 103, 360/104, 130.34

[56] References Cited

U.S. PATENT DOCUMENTS 4,620,250  10/1986  Hills .

*Primary Examiner*—Carl E. Hall
*Attorney, Agent, or Firm*—Guy W. Shoup; Paul J. Winters

[57] ABSTRACT

A method of producing a magnetic head with use of a mounting jig which comprises a head projection amount setting member having a flat portion adapted to contact an upper surface of a vacuum generating member formed with a vacuum generating recess and having a recessed portion recessed from the flat portion by a predetermined depth corresponding to a projection amount of a magnetic head to be projected from a substantially central through-hole of the vacuum generating member; a presser member mounted on a side of the flat portion of the head projection amount setting member and provided with presser pawls for holding the vacuum generating member and pressing the same against the flat portion of the head projection amount setting member; an inclination adjusting member for adjusting parallelism of the magnetic head; and a height adjusting member connected to the presser member and the head projection amount setting member for adjusting a vertical position of the head projection amount setting member with respect to the magnetic head.

1 Claim, 12 Drawing Sheets

Fig.4(a)  Fig.4(b)
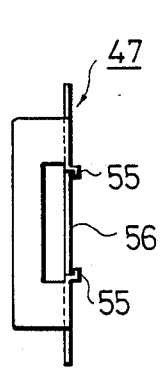
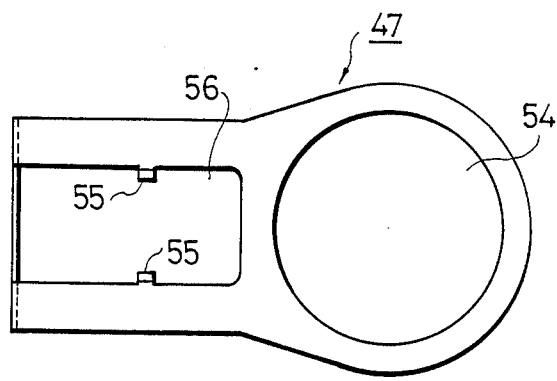
Fig.5(a)  Fig.5(b)
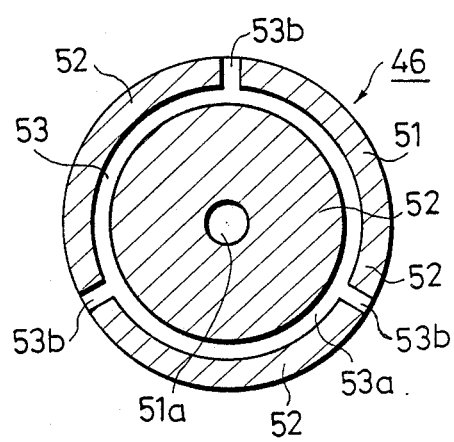
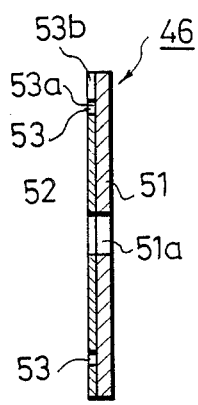

METHOD OF PRODUCING MAGNETIC HEAD DEVICE

BACKGROUND OF THE INVENTION

The present invention relates to a method of producing a magnetic head device for use with a magnetic disk driving device for recording or reproducing information with respect to a disk-like magnetic recording medium.

Such a magnetic disk driving device for recording or reproducing information with respect to a disk-like magnetic recording medium (which will be hereinafter referred to as a disk) is widely used as an external storage for an information processing apparatus such as computer and word processor.

An example of the information processing apparatus is a so-called still video floppy disk driving device. The disk driving device is installed in a still video floppy camera, and it is designed to record video information on a still video floppy disk in the same manner as with a camera device using a photosensitive film.

This type of disk driving device is disclosed in Japanese Utility Model Publication No. 42-17806, for example.

This reference relates to a device for recording and reproducing a signal as rotating a very thin magnetic disk sheet of 50 μ or less thick at a high speed such that the magnetic disk sheet can be maintained under a planar condition by a centrifugal force. A base mounting the sheet thereon is formed with a recess where a magnetic head is adjustably received. The recess is slightly inclined in a direction opposite to a rotative direction of the sheet in accordance with deformation of the sheet passing over the recess. During the rotation of the sheet, the pressure between the magnetic sheet and the base is rendered slightly smaller than the pressure over the magnetic sheet, resulting that the magnetic sheet is sunk into the recess. Accordingly, the contact between the magnetic sheet and a head gap of the magnetic head projecting upwardly from a head mounting surface may be stabilized.

In this prior art, the disk sheet is flexed as if it were sucked into the recess to face the head gap of the magnetic head under a constant condition. Accordingly, it is possible to maintain a constant video quality in recording and reproducing information without the necessity of especially restricting the position of the disk sheet with respect to the head gap.

In this kind of conventional technique, it is particularly important to maintain a stable sliding contact condition between the magnetic sheet rotating at a high speed and the magnetic head, so as to establish stable recording and reproducing with high reliability. To this end, it is necessary to project the magnetic head by a predetermined amount from a magnetic sheet sliding contact surface of the head mounting member.

Such a magnetic head device including a mechanism for adjusting a projection amount of the magnetic head is disclosed in Japanese Patent Laid-open Publication No. 61-9869, for example.

FIG. 14 shows a schematic illustration in section of the magnetic head device in this prior art. Referring to FIG. 14, the magnetic head device includes a magnetic sheet 1 adapted to be rotated by a motor, a magnetic head 2 for recording and reproducing information with respect to the magnetic sheet 1, and a head contacting member 3 for bringing the magnetic head 2 into slide contact with the magnetic sheet 1. The head contacting member 3 includes a body 5 formed with a tapering surface 4 opposed to the magnetic sheet 1. The tapering surface 4 contacts the magnetic sheet 1 at one end and inclined in such a manner that a distance between the magnetic sheet 1 and the tapering surface 4 is gradually increased from the one end to the other end along a direction of a recording track of the magnetic sheet 1. The body 4 is formed at its central portion with a magnetic head mounting space 6 for mounting a magnetic head 2 in such a manner that a head gap of the magnetic head 2 is adjustably projected from the tapering surface 4 toward the recording surface of the magnetic sheet 1. The magnetic head 2 is fixed to one end of a base 7, and the base 7 is mounted at its center to an inner wall of the space 6 by a screw 8. Lead wires 9 and 10 extending from an exciting coil of the magnetic head 2 are soldered to connection conductors 11 and 12 formed on the base 7, respectively. The projection amount of the head gap projecting from the tapering surface 4 is adjusted by slightly loosening the screw 8 and moving the base 7 in a direction depicted by arrow in FIG. 14.

In the construction of the prior art as mentioned above, the magnetic head 2 is mounted to the base 7 which is mounted by the screw 8 in the space 6 formed in the head contacting member 3. Thus, many parts are required to render the structure complicated. Further, the fine adjustment of the projection amount of the magnetic head 2 is difficult because the projection amount is finely varied upon tightening of the screw 8. As a result, the sliding contact condition of the magnetic sheet 1 with respect to the magnetic head 2 is rendered unstable, and the reliable recording and reproducing cannot be ensured. Moreover, the unstable sliding contact condition causes a problem such that the magnetic sheet 1 will be struck against the magnetic head 2 or the head contacting member 3, and a protective layer covering the recording surface of the magnetic sheet 1 will be damaged to cause deposition of ferrite (Fe) forming the recording surface to the magnetic head 2, resulting in a short life of the magnetic head 2 and the magnetic sheet 1.

SUMMARY OF THE INVENTION

It is a primary object of the present invention to provide a method of producing a magnetic head device, in which a magnetic head may be projected from a vacuum generating member by a predetermined amount simply and accurately.

It is another object of the present invention to provide a method of producing a magnetic head device which may prevent damage of a magnetic disk and lengthen a life of the disk and the magnetic head.

According to the present invention, there is provided a method of producing a magnetic head with use of a mounting jig which comprises a head projection amount setting member having a flat portion adapted to contact an upper surface of a vacuum generating member formed with a vacuum generating recess and having a recessed portion recessed from said flat portion by a predetermined depth corresponding to a projection amount of a magnetic head to be projected from a substantially central through-hole of said vacuum generating member; a presser member mounted on a side of said flat portion of said head projection amount setting member and provided with presser pawls for holding said vacuum generating member and pressing the same against said flat portion of said head projection amount setting member; an inclination adjusting member for adjusting parallelism of said magnetic head; and a height adjusting member connected to said presser member and said head projection amount setting member for adjusting a vertical position of said head projection amount setting member with respect to said magnetic head; said method comprising the steps of mounting said magnetic head to said inclination adjusting member; contacting said magnetic head with said recessed portion of said head projection amount setting member; applying light to an upper surface of said magnetic head via said head projection amount setting member under a contact condition of said magnetic head with said recessed portion to generate interference fringes; adjusting said inclination adjusting member in accordance with said interference fringes to adjust the parallelism of said magnetic head; mounting said vacuum generating member to said presser pawls of said presser member; inserting said magnetic head into said through-hole of said vacuum generating member; contacting again said magnetic head and said vacuum generating member with said recessed portion and said flat portion of said head projection amount setting member, respectively; applying again light to said magnetic head and said vacuum generating member via said head projection amount setting member to generate interference fringes; adjusting again said inclination adjusting member in accordance with said interference fringes to adjust the parallelism of said magnetic head and said vacuum generating member; and fixing said magnetic head to said vacuum generating member.

As the depth of the recessed portion of the head projection amount setting member is set in accordance with the projection amount of the magnetic head, the magnetic head may be projected simply and accurately by contacting the upper surface of the magnetic head with the recessed portion of the head projection amount setting member and contacting the vacuum generating member with the flat portion of the head projection amount setting member.

The vacuum generating member supporting the magnetic head is mounted to the presser member mounted with the head projection amount setting member to a motor, and the parallelism of the magnetic head is adjusted by the inclination adjusting member. Accordingly, the parallelism may be adjusted simply.

As the motor may be utilized as a dummy of a motor unit for a disk driving device, the adjustment of the disk driving device may be carried out simply.

Further, the parallelism of the magnetic head can be checked simply by observing the interference fringes.

Thus, the magnetic head device with the predetermined projection amount of the magnetic head can be obtained accurately. Accordingly, the sliding contact condition of the disk sliding on the magnetic head may be stabilized, thereby eliminating the risk that the protective layer of the disk will be damaged and lengthening the life of the disk and the magnetic head device.

Other objects and features of the invention will be more fully understood from the following detailed description and appended claims when taken with the accompanying drawings.

BRIEF DESCRIPTION OF THE DRAWINGS

FIG. 4A is an elevational view of the presser member;

FIG. 4B is a plan view of the presser member;

FIG. 5A is a bottom plan view of the head projection amount setting member;

FIG. 5B is a vertical sectional view of the head projection amount setting member;

DETAILED DESCRIPTION OF THE PREFERRED EMBODIMENT

There will now be described a preferred embodiment of the present invention with reference to the drawings.

The magnetic head device produced by using the mounting jig according to the present invention is mounted in a still video floppy disk driving device (which will be hereinafter referred to as a SVF device).

Figure 9A:
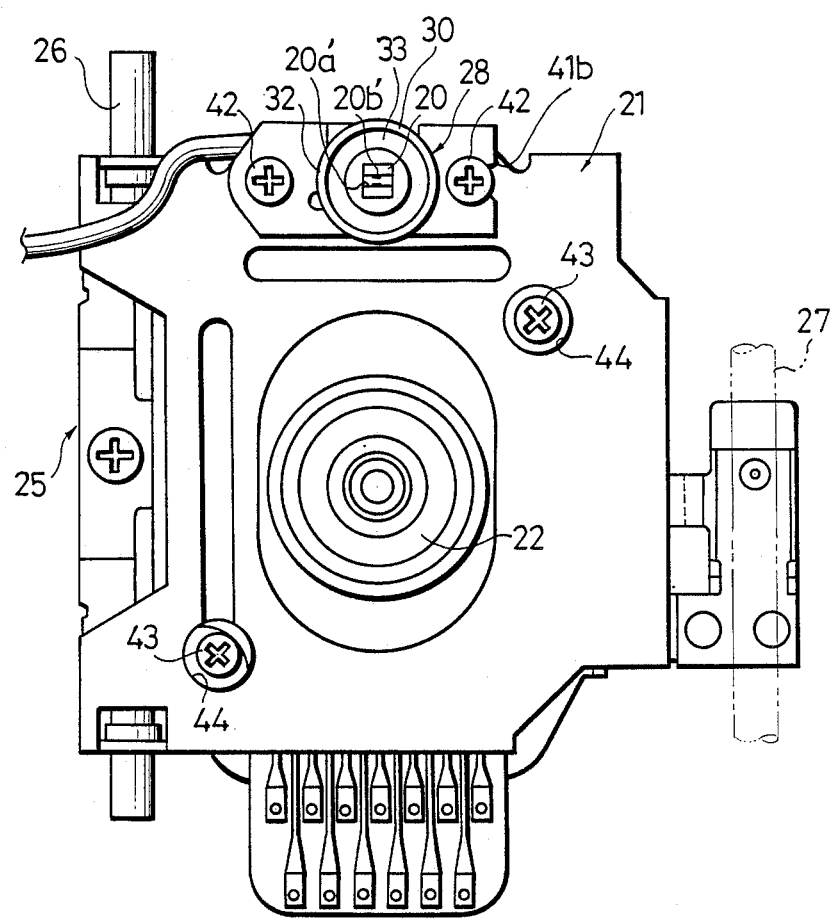
FIG. 9A is a plan view of a carriage and a spindle motor unit of a still video floppy disk driving device mounting the magnetic head device thereon produced by the method according to the present invention.
Figure 9B:
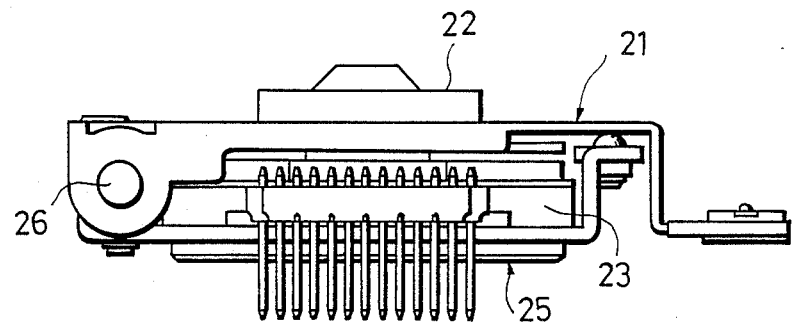
FIG. 9B is an elevational view of FIG. 9A.
Figure 9C:
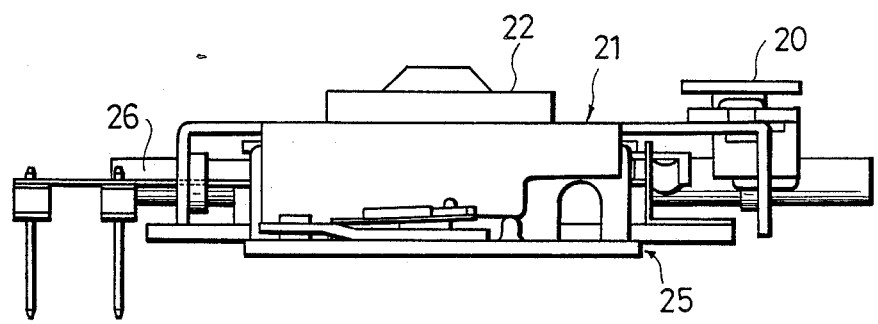
FIG. 9C is a side view of FIG. 9A.

The SVF device is primarily constituted of a frame, a holder mounted in the frame for holding a disk cartridge, a carriage 21 carrying a magnetic head 20 as shown in FIGS. 9A to 9C, a carriage moving mechanism for moving the carriage 21 in a radial direction of a disk 24, a turn table 22 for mounting the disk 24 thereon as shown in FIGS. 9A to 9C, and a spindle motor 23 for rotating the turn table 22.

The disk 24 as a magnetic recording medium to be rotated by the disk driving device is carried in a hard case (not shown) to form the disk cartridge. The hard case has a central opening for exposing a hub of the disk 24, and is provided with a slidable shutter formed of a thin sheet metal for opening or closing a head insert portion of the case.

As shown in FIGS. 9A to 9C, the carriage 21 is mounted on a motor unit 25 including the spindle motor 23, and is slidably supported to a guide shaft 26 carried by the motor unit 25. The carriage 21 is engaged with a screw shaft 27 (shown by an alternate long and short dash line) formed with an intermittent driving thread portion. The screw shaft 27 is rotated by the carriage moving mechanism to move the carriage 21 in the radial direction of the disk 24 along the guide shaft 26, so that the magnetic head 20 located at an upper position of the carriage 21 as viewed in FIG. 9A may be moved to a desired record track position on the disk 24 to carry out recording and/or reproducing.

Figure 12A:
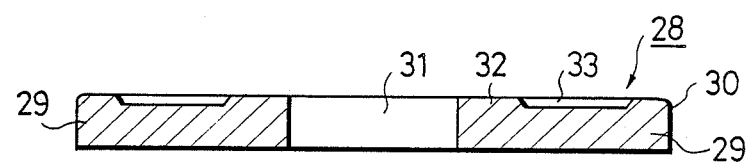
FIG. 12A is a vertical sectional view of the vacuum generating member.
Figure 12B:
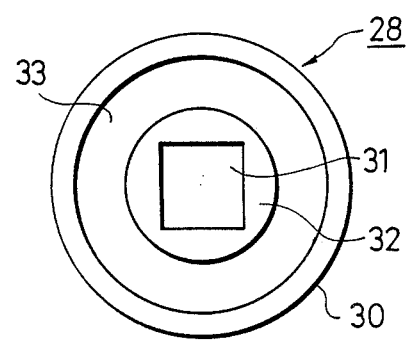
FIG. 12B is a plan view of the vacuum generating member.
Figure 13A:
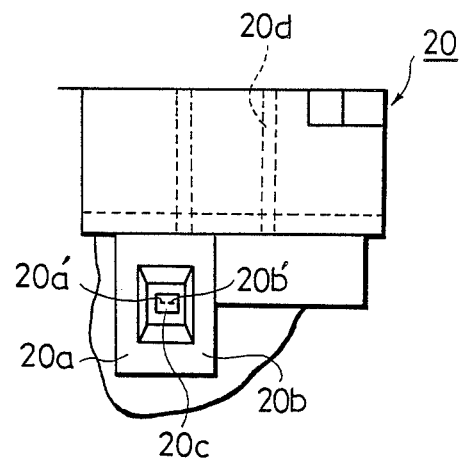
FIG. 13A is a plan view of the magnetic head.
Figure 13B:
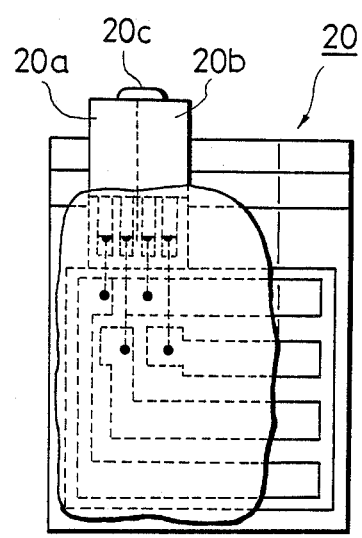
FIG. 13B is an elevational view of FIG. 13A.
Figure 13C:
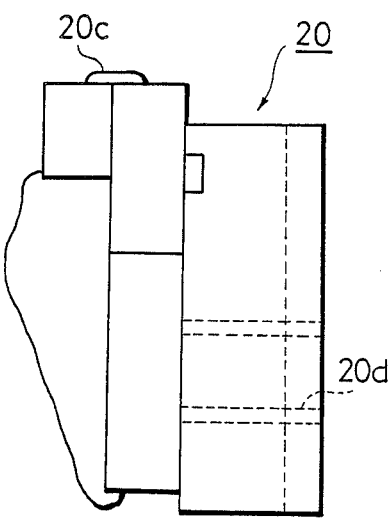
FIG. 13C is a side view of FIG. 13A.
Figure 14:
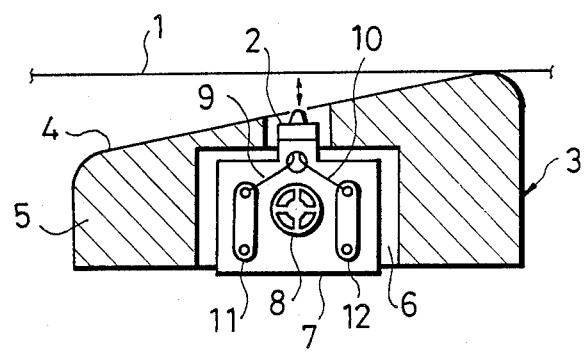
FIG. 14 is a sectional view of an essential part of the magnetic head device in the prior art.

As shown in FIGS. 13A to 13C, the magnetic head 20 is a so-called double in-line type head having two combined magnetic heads 10a and 20b for obtaining a frame image. The magnetic head 20 is fixedly supported at a substantially central portion of a disk-like support 28 as a vacuum generating member to be mounted to the carriage 21 in substantially parallel relationship to the disk 24. As shown in FIGS. 12A and 12B, the disk-like support 28 is formed at its outer periphery 29 with a first annular projection 30 and at its central portion with a square hole 31 for mounting the magnetic head 20, around the square hole 31 being formed a second projection 32, so that a first annular recess 33 is formed between the first projection 30 and the second projection 32. As apparent from FIG. 11, there is also defined a second recess 34 between the second projection 32 and a gap forming portion 20c of the magnetic head 20.

The magnetic head 20 is fixed to the support 28 in such a manner that the gap forming portion 20c is inserted into the mount hole 31 from the under side of the support 28 until the gap forming portion 20c projects from upper surfaces of the first and second projections 30 and 32 by about 5 $\mu$m.

Figure 11:
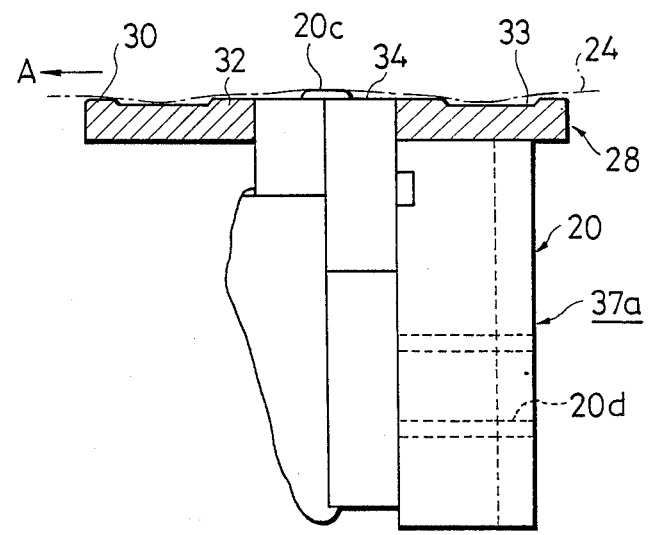
FIG. 11 is a sectional view illustrating the relation amoung the vacuum generating member, the magnetic head and the disk.

In recording or reproducing information with use of the SVF device as mentioned above, the disk 24 is rotated in a direction as depicted by arrow A in FIG. 11 at a high speed. Accordingly, there is created a vacuum at the first recess 33, attracting the disk 24 to the upper surface of the support 28 and deforming the disk 24 in accordance with the unevenness of the upper surface of the support 28. The vacuum created at the first recess 33 is induced to the gap forming portion 20c of the magnetic head 20 with the height of the disk 24 being restricted by the second projection 32 because of difference in relative position between the first projection 30 and the first recess 33 in accordance with Bernoulli's theorem. As a result, the disk 24 is deformed at the gap forming portion 20c of the magnetic head 20 in accordance with a curvature of the gap forming portion 20c, thereby stabilizing the sliding contact condition of the disk 24 with respect to the magnetic head 20. In this case, since the second recess 34 is defined between the second projection 32 and the gap forming portion 20c, there is also created a vacuum at the second recess 34 to ensure the deformation of the disk 24 in accordance with the curvature of the gap forming portion 20c.

Figure 7A:
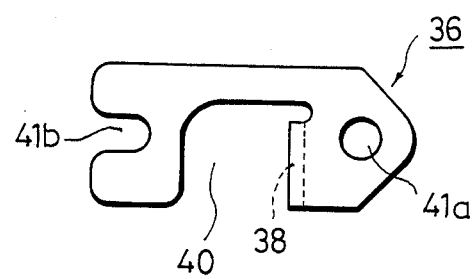
FIG. 7A is a plan view of the head plate.
Figure 7B:
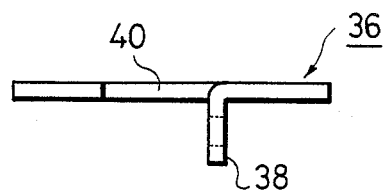
FIG. 7B is an elevational view of FIG. 7A.
Figure 7C:
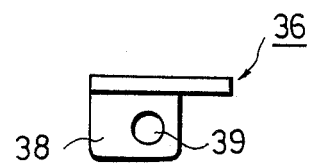
FIG. 7C is a side view of FIG. 7A.
Figure 8:
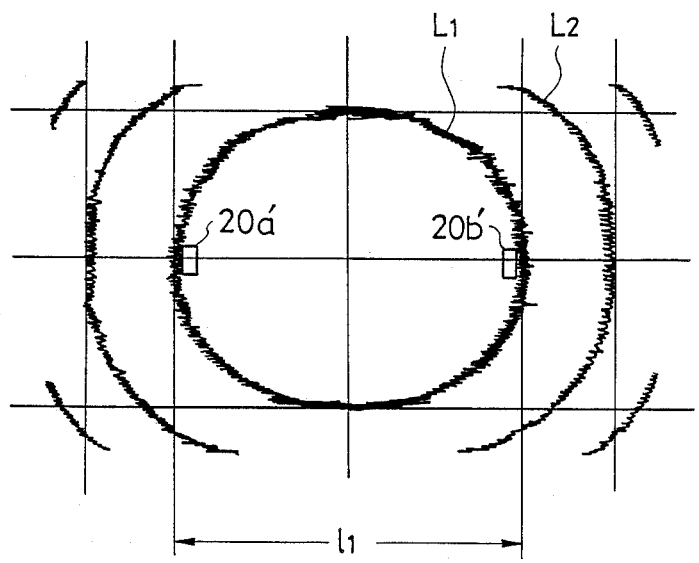
FIG. 8 is an illustration of the interference fringes by a SR measuring process.
Figure 10A:
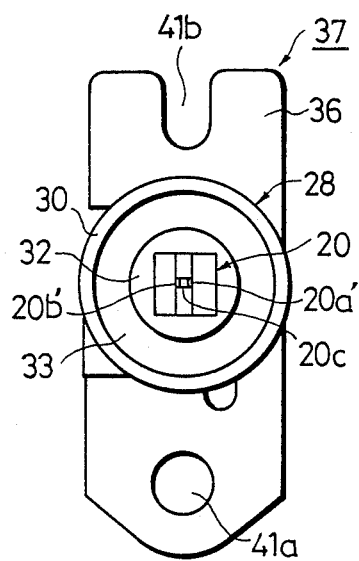
FIG. 10A is a plan view of the assembly of the magnetic head, the vacuum generating member and the head plate.
Figure 10B:
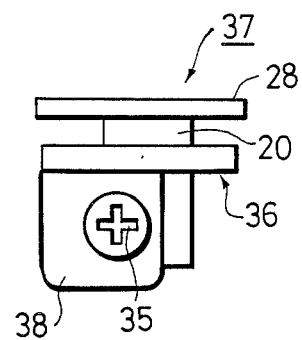
FIG. 10B is an elevational view of FIG. 10A.
Figure 10C:
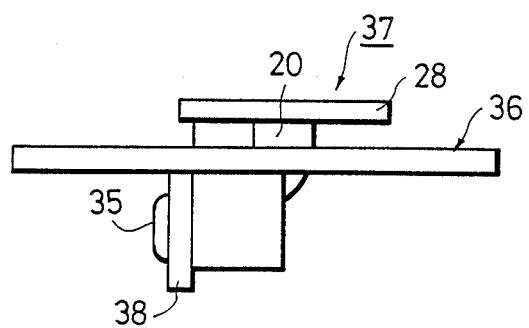
FIG. 10C is a side view of FIG. 10A.

As shown in FIG. 11, the magnetic head 20 is formed with a tapped hole 20D to be engaged with a screw 35 for connecting a head plate 36 to the magnetic head 20 as shown in FIGS. 10A to 10C, thus constructing a magnetic head device 37. As shown in FIGS. 7A to 7C, the head plate 36 is formed with a bent portion 38 having an insert hole 39 for inserting the screw 35. A cutout 40 is defined by forming the bent portion 38, so as to locate the magnetic head 20 in the cutout 40. The head plate 36 is further formed with a through-hole 41a and a recess 41b for inserting screws 42, so as to mount the head plate 36 to the carriage 21 as shown in FIG. 9A. Such mounting allows azimuth adjustment.

As shown in FIG. 9A, the mounting of the motor unit 35 to the frame is established by threadedly engaging screws 43 with tapped holes (not shown) formed in the frame. The screws 43 are tightened by a screw driver or the like inserted from holes 44 formed through the carriage 21 at the positions corresponding to the screws 43. Thus, the motor unit 25 is fixedly mounted to the frame, and the carriage 21 mounted on the motor unit 25 through the guide shaft 26 is also mounted to the frame.

There will now be described a method of producing the magnetic head device as mentioned above.

Figure 1:
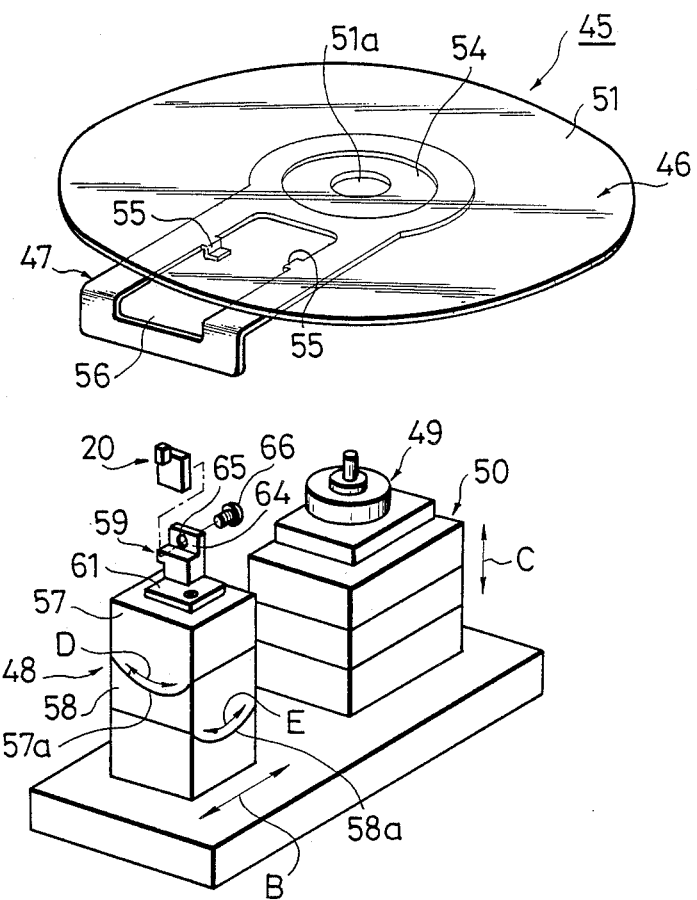
FIG. 1 is a perspective view of the mounting jig for the magnetic head device according to a preferred embodiment of the present invention.
Figure 2:
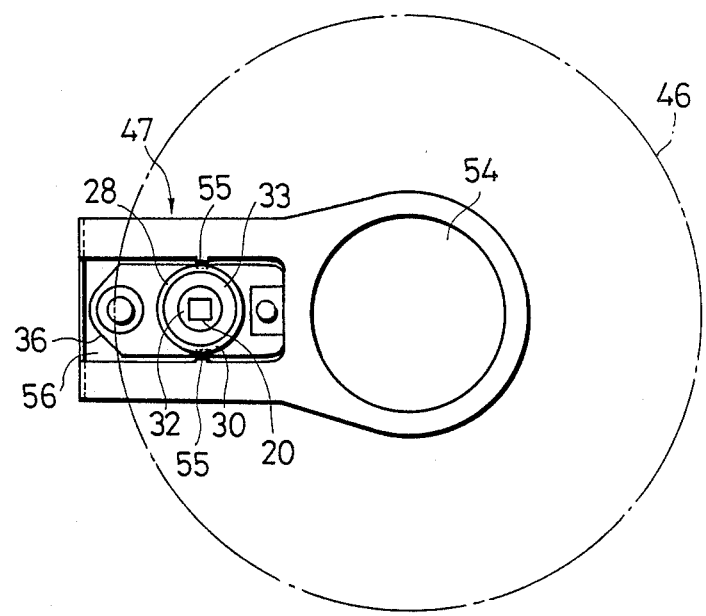
FIG. 2 is a plan view of an essential part of the mounting jig.

Referring first to FIG. 1 which shows a mounting jig 45 to be used in producing the magnetic head device, the mounting jig 45 is constructed of a head projection amount setting member 46, a presser member 47 attached to the head projection amount setting member 46, an inclination adjusting member 48 for mounting the magnetic head 20 thereon and adjusting the parallelism of the magnetic head 20, a spindle motor 49 mounted to the presser member 47, and a height adjusting member 50 for adjusting the height of the spindle motor 49.

Referring to FIGS. 5A and 5B, the head projection amount setting member 46 is constructed of a glass disk 51, a coating layer 52 (hatched portion in FIG. 5A) formed by sputtering $SiO_2$ on a surface of the glass disk 51, and an annular groove 53 not sputtered. The coating layer 52 has a thickness of 5 $\mu$m, and resultantly, the annular groove 53 has a depth of 5 $\mu$m which is equal to the projection amount of the magnetic head 20. The gap forming portion 20c of the magnetic head 20 is adapted to abut against a bottom surface 53a of the annular groove 53, and the first and second projections 30 and 32 of the support 28 are adapted to abut against the coating layer 52. Reference numeral 51a designates a mount hole for mounting the head projection amount setting member 46 to a drive shaft of the motor 49, and reference numerals 53b designate radial grooves resultantly formed by clamping the glass disk 51 in sputtering.

The head projection amount setting member 46 may be produced in the following manner. First, a portion of the surface of the glass disk 51 to be formed into the annular groove 53 is covered with a resist. Then, the disk 51 is clamped by a jig at three positions circumferentially 120° spaced (which will result in the formation of the radial grooves 53b), and $SiO_2$ is sputtered onto the disk 51. Thereafter, the resist is removed to form the annular groove 53, and the accuracy of the depth of the annular groove 53 is checked by a dial gauge. Thus, the head projection amount setting member 46 as shown in FIGS. 5A and 5B is obtained.

Figure 3A:
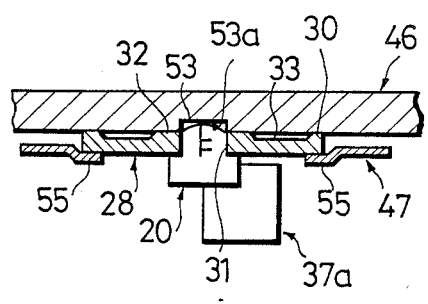
FIG. 3A is a sectional view of mounting of the magnetic head device to the presser member.

Referring to FIGS. 4A and 4B, the presser member 47 is formed with a mount hole 54 to be engaged with a mounting portion of the drive shaft of the spindle motor 49 and with an opening 56 to be exposed to the magnetic head device. A pair of presser pawls 55 are so formed as to inwardly project from the opposite sides of the opening 56. The presser pawls 55 are so bent as to receive the thickness of the support 28 and urge the support 28 against the head projection amount setting member 46 as shown in FIG. 3A. Further, the head projection amount setting member 46 is also mounted at the mount hole 51a to the mounting portion of the drive shaft of the spindle motor 49. Thus, both the head projection amount setting member 46 and the presser member 47 are mounted to the spindle motor 49 under the condition where the head projection amount setting member 46 is stacked on the presser member 47.

Figure 6A:
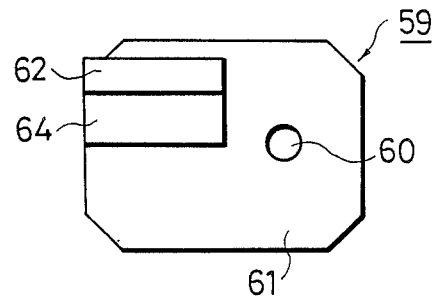
FIG. 6A is a plan view of a head mounting block.
Figure 6B:
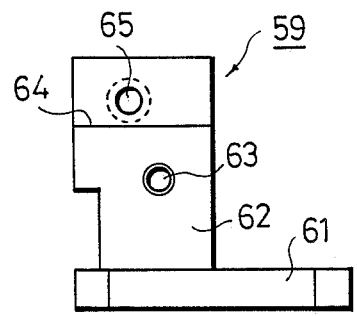
FIG. 6B is an elevational view of FIG. 6A.
Figure 6C:
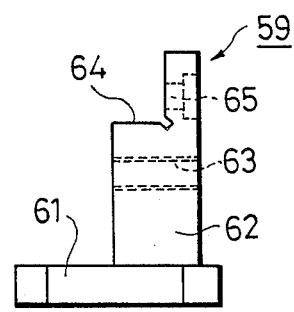
FIG. 6C is a side view of FIG. 6A.

As shown in FIG. 1, the inclination adjusting member 48 includes a first rocking portion 57 rockable in a direction depicted by arrow D and a second rocking portion 58 rockable in a direction depicted by arrow E. The first rocking portion 57 and the second rocking portion 58 have sliding contact surfaces 57a and 58a, respectively, each being formed from a part of an outer cylindrical surface of a circular cylinder. The sliding contact surfaces 57a and 58a are arranged in such a manner that the axial directions of the circular cylinders forming these surfaces are substantially perpendicular to each other. With this arrangement, the inclination adjusting member 48 is freely rockable in a synthetic direction of the arrows D and E. A head mounting block 59 as shown in FIGS. 6A to 6C is mounted on the upper surface of the first rocking portion 57 of the inclination adjusting member 48. Referring to FIGS. 6A to 6C, the head mounting block 59 is constructed of a bottom plate 61 formed with a through-hole 60 and a mounting portion 62 standing on the bottom plate 61. The bottom plate 61 is fixed to the upper surface of the first rocking portion 57 by inserting a screw into the through-hole 60 and locking the screw. The mounting portion 62 is formed at its central position with a tapped hole 63, and at its upper end with a stepped portion 64 for mounting the magnetic head 20 thereon. The stepped portion 64 has a side wall formed with a hole 65 for inserting a screw 66 therethrough. Thus, the magnetic head 20 is fixedly mounted on the stepped portion 64 by tightening the screw 66. The inclination adjusting member 48 is horizontally movable in a direction depicted by arrow B in FIG. 1 toward or away from the spindle motor 49.

The spindle motor 49 is mounted on the height adjusting member 50 in such a manner that the drive shaft extends upwardly, and the mounting portion of the drive shaft is mounted to the presser member 47 and the head projection amount setting member 46. The spindle motor 49 is vertically movable by the height adjusting member 50 in a direction depicted by arrow C in FIG. 1.

Thus, the mounting jig for the magnetic head device is constructed above. Next, there will be described the method of producing the magnetic head device by using the above mounting jig.

First, the magnetic head 20 is mounted with the screw 66 to the stepped portion 64 of the head mounting block 59 fixed to the upper surface of the inclination adjusting member 48. On the other hand, the presser member 47 and the head projection amount setting member 46 are mounted to the mounting portion of the drive shaft of the spindle motor 49. Then, the inclination adjusting member 48 is moved in the direction of arrow B so as to have the gap forming portion 20c of the magnetic head 20 be opposed to the annular groove 53 of the head projection amount setting member 46. Then, the spindle motor 49 is lowered by the height adjusting member 50 to lower the head projection amount setting member 46 and thereby have the bottom surface 53a of the annular groove 53 of the head projection amount setting member 46 contact the gap forming portion 20 c of the magnetic head 20. Then, the inclination adjusting member 48 is rocked in the direction of arrow D or E to adjust the parallelism of the gap forming portion 20c. The adjustment of the parallelism is conducted by a so-called SR measuring process. That is, an intensive light is applied to the gap forming portion 20c from the upper side of the head projection amount setting member 46 to generate interference fringes such as a first interference fringe $L_1$, a second interference fringe $L_2$ and so on. Then, a diameter $l_1$ of the first interference fringe $L_1$ is adjusted to track edges of both channels 20a' and 20b', thus adjusting the parallelism of the gap forming portion 20c.

Under the above condition, the inclination adjusting member 48 is locked, and the spindle motor 49 is raised by the height adjusting member 50 to separate the head projection amount setting member 46 from the magnetic head 20. Then, the support 28 is mounted to the presser pawls 55 of the presser member 47 in such a manner that the first and second projections 30 and 32 of the support 28 abut against the lower surface of the coating layer 52 of the head projection amount setting member 46. Then, the head projection amount setting member 46 and the presser member 47 are lowered by lowering the height adjusting member 50 to engage the mount hole 31 of the support 28 with the gap forming portion 20c of the magnetic head 20, thus assembling the support 28 with the magnetic head 20. Under the condition, the gap forming portion 20c of the magnetic head 20 is in contact again with the bottom surface 53a of the annular groove 53 of the head projection amount setting member 46. As the depth of the annular groove 53 is set to 5 μm, the gap forming portion 20c of the magnetic head 20 projects by 5 μm from the upper surfaces of the first and second projections 30 and 32 of the support 28 contacting the coating layer 52. Under the condition, the above-mentioned SR measuring process is conducted again to generate interference fringes and check whether or not the interference fringes are slipped. If the interference fringes are slipped, the inclination adjusting member 48 is rocked again to adjust the parallelism. In the SR measuring process, if the upper flat surfaces of the first and second projections 30 and 32 are viewed in rainbow color, it can be checked that the upper flat surfaces closely contact the coating layer 55 of the head projection amount setting member 46. In this manner, the parallelism of the gap forming portion 20c of the magnetic head 20 and the support 28 can be properly obtained.

After ensuring the proper parallelism, the magnetic head 20 is temporarily bonded to the mount hole 31 of the support 28 by instantaneous adhesive, and a magnetic head assembly 37a constructed of the magnetic head 20 and the support 28 is removed from the mounting jig. Then, a projection amount of the gap forming portion 20c of the magnetic head 20 projecting from the upper surfaces of the first and second projections 30 and 32 of the support 28 is measured by a dial gauge to check the projection amount is 5 μm. Then, the magnetic head 20 and the support 28 are finally bonded to each other by epoxy resin.

Figure 3B:
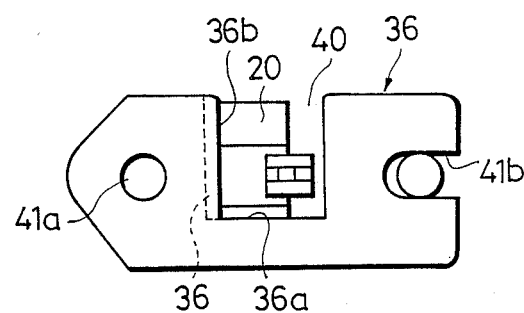
FIG. 3B is a plan view of mounting of the magnetic head device to a head plate.

Thereafter, the support 28 of the magnetic head assembly 37a is mounted to the presser pawls 55 of the presser member 47 to have the upper surfaces of the support 28 and the magnetic head 20 contact the lower surface of the head projection amount setting member 46 as shown in FIG. 3A. Then, the magnetic head assembly 37a is mounted to the head plate 36 fixed to the carriage 21 as rotating the head projection amount setting member 46 by the spindle motor 49. Then, the magnetic head 20 is fitted on positioning surfaces 36a and 36b of the head plate 36 as shown in FIG. 3B, and is temporarily bonded to the head plate 36 by instantaneous adhesive. Thereafter, the magnetic head assembly 37a is removed from the head projection amount setting member 46 and the presser member 47, while the head plate 46 is removed from the carriage 21. Then, the magnetic head assembly 37a and the head plate 36 are finally bonded to each other by epoxy resin. Thus, the assembly of the magnetic head 20, the support 28 and the head plate 36 is obtained as the magnetic head device 37 as shown in FIGS. 10A to 10C. Thereafter, the head plate 36 is mounted to the carriage 21 again, and the interference fringes at the gap forming portion 20c of the magnetic head 20 and the upper surface of the support 28 are checked again by the above-mentioned SR measuring process.

Then, the carriage 21 mounting the magnetic head device 37 thereon is removed from the jig, and head cords are connected. Further, azimuth adjustment is carried out by using an azimuth disk to adjust a mount position of the head plate 36 with respect to the carriage 21. The azimuth adjustment is carried out at 1, 24 and 50 TK, and track movement is carried out by a micrometer head. Then, the spindle motor 49 and a PG sensor are connected to a record/playback circuit to measure a video jitter. Then, the unit having the spindle motor 49 and the carriage 21 mounted on the unit are removed from the jig, thus obtaining the carriage 21 and the motor unit 25 as shown in FIGS. 9A to 9C.

According to the preferred embodiment as mentioned above, the upper surface of the gap forming portion 20c of the magnetic head 20 is brought into contact with the bottom surface 53a of the annular groove 53 of the head projection amount setting member 46, and the upper surfaces of the first and second projections 30 and 32 of the support 28 are brought into contact with the lower surface of the coating layer 52 of the head projection amount setting member 46. Since the depth of the annular groove 53 is set to 5 $\mu$m, the projection amount of the gap forming portion 20c of the magnetic head 20 from the upper surfaces of the first and second projections 30 and 32 can be set to 5 $\mu$m. Thus, the projection amount of the gap forming portion 20c can be set simply and accurately.

The support 28 supporting the magnetic head 20 is mounted to the presser member 47 mounted with the head projection amount setting member 46 to the spindle motor 49, and the parallelism of the magnetic head 20 is adjusted by the inclination adjusting member 48. Accordingly, the parallelism of the magnetic head 20 can be adjusted simply.

Further, if the accuracy of the depth of the annular groove 53 at a portion used for setting the parallelism is reduced, the head projection amount setting member 46 may be rotated by the spindle motor 49 to thereby allow the use of any other unused portion of the annular groove 53.

As the spindle motor 49 may be utilized as a dummy of the motor unit 25, the adjustment of the disk driving device may be carried out simply.

Further, the parallelism of the gap forming portion 20c of the magnetic head 20 can be checked simply by observing the interference fringes.

As each component is held by the jig after adjustment, temporary fixing of each component may be carried out simply and reliably.

Thus, the magnetic head device with the projection amount of 5 $\mu$m of the magnetic head may be obtained accurately. Accordingly, the sliding contact condition of the disk 24 sliding on the magnetic head may be stabilized, thereby eliminating the risk that the protective layer of the disk 24 will be damaged and lengthening the life of the disk 24 and the magnetic head device 37.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A method of producing a magnetic head with use of a mounting jig which comprises a head projection amount setting member having a flat portion adapted to contact an upper surface of a vacuum generating member formed with a vacuum generating recess and having a recessed portion recessed from said flat portion by a predetermined depth corresponding to a projection amount of a magnetic head to be projected from a substantially central through-hole of said vacuum generating member; a presser member mounted on a side of said flat portion of said head projection amount setting member and provided with presser pawls for holding said vacuum generating member and pressing the same against said flat portion of said head projection amount setting member; an inclination adjusting member for adjusting parallelism of said magnetic head; and a height adjusting member connected to said presser member and said head projection amount setting member for adjusting a vertical position of said head projection amount setting member with respect to said magnetic head; said method comprising the steps of:

mounting said magnetic head to said inclination adjusting member;

contacting said magnetic head with said recessed portion of said head projection amount setting member;

applying light to an upper surface of said magnetic head via said head projection amount setting member under a contact condition of said magnetic head with said recessed portion to generate interference fringes;

adjusting said inclination adjusting member in accordance with said interference fringes to adjust the parallelism of said magnetic head;

mounting said vacuum generating member to said presser pawls of said presser member;

inserting said magnetic head into said through-hole of said vacuum generating member;

contacting again said magnetic head and said vacuum generating member with said recessed portion and said flat portion of said head projection amount setting member, respectively;

applying again light to said magnetic head and said vacuum generating member via said head projection amount setting member to generate interference fringes;

adjusting again said inclination adjusting member in accordance with said interference fringes to adjust the parallelism of said magnetic head and said vacuum generating member; and fixing said magnetic head to said vacuum generating member.

* * * * *